(12) United States Patent
Snelling et al.

(10) Patent No.: US 8,950,679 B2
(45) Date of Patent: Feb. 10, 2015

(54) SECURITY SUBSTRATES FOR SECURITY DOCUMENTS

(75) Inventors: James Peter Snelling, Hampshire (GB); Fern Dowdall, Hampshire (GB)

(73) Assignee: De La Rue International Limited, Basingstoke, Hampshire (GB)

( * ) Notice: Subject to any disclaimer, the term of this patent is extended or adjusted under 35 U.S.C. 154(b) by 282 days.

(21) Appl. No.: 13/581,451

(22) PCT Filed: Feb. 16, 2011

(86) PCT No.: PCT/GB2011/000218
§ 371 (c)(1),
(2), (4) Date: Nov. 25, 2012

(87) PCT Pub. No.: WO2011/110799
PCT Pub. Date: Sep. 15, 2011

(65) Prior Publication Data
US 2013/0062416 A1 Mar. 14, 2013

(30) Foreign Application Priority Data
Mar. 8, 2010 (GB) .................................. 1003824.8

(51) Int. Cl.
G06K 19/06 (2006.01)
G06K 19/08 (2006.01)
G06K 1/12 (2006.01)

(52) U.S. Cl.
CPC ................. *G06K 19/08* (2013.01); *G06K 1/125* (2013.01); *G06K 19/06187* (2013.01)
USPC .......................................... 235/491; 235/492

(58) Field of Classification Search
CPC ... G06Q 20/102; G06Q 20/20; G06Q 20/204; G06Q 20/227; G06Q 20/341; G06Q 20/3558; G06Q 20/3572; G07F 17/42; G07F 7/02; G07F 7/082; G07F 7/1008; G06K 19/06196; G06K 19/07739; G06K 19/08; B42D 2033/16; B42D 15/10; A45C 11/182; B65D 73/0078; B65D 75/5833
USPC ........................................... 235/491, 487, 492
See application file for complete search history.

(56) References Cited

U.S. PATENT DOCUMENTS

| | | | |
|---|---|---|---|
| 5,206,494 A | 4/1993 | Metzger | |
| 7,878,549 B2 * | 2/2011 | Simske et al. | 283/17 |
| 7,918,485 B2 * | 4/2011 | Iftime et al. | 283/83 |
| 2004/0084894 A1 | 5/2004 | Fan et al. | |
| 2004/0245343 A1 | 12/2004 | Depta | |
| 2005/0045732 A1 * | 3/2005 | Whitaker | 235/493 |
| 2007/0095921 A1 * | 5/2007 | Roth | 235/491 |
| 2009/0020616 A1 * | 1/2009 | Zoister et al. | 235/493 |

FOREIGN PATENT DOCUMENTS

| | | |
|---|---|---|
| EP | 0407550 | 7/1990 |
| EP | 1254765 A1 | 11/2002 |
| EP | 1291195 A1 | 3/2003 |
| EP | 1545902 | 4/2004 |

(Continued)

*Primary Examiner* — Thien M Le
(74) *Attorney, Agent, or Firm* — Gable Gotwals

(57) ABSTRACT

The invention relates to improvements in security substrates for security documents. The security substrate has at least two sets of regions having a machine detectable characteristic, in which only a first set of regions is applied to a first surface of the substrate. At least two sets of regions together form a machine readable code.

19 Claims, 5 Drawing Sheets

(56) References Cited

FOREIGN PATENT DOCUMENTS

| | | |
|---|---|---|
| EP | 1567714 | 6/2004 |
| EP | 1599346 | 9/2004 |
| EP | 1770657 A2 | 4/2007 |
| EP | 1847400 A2 | 10/2007 |
| GB | 2325883 A | 12/1998 |
| GB | 2330111 A | 4/1999 |
| GB | 2387812 A | 10/2003 |
| GB | 2387813 A | 10/2003 |
| WO | WO 97/39428 | 10/1997 |
| WO | WO 2009/097979 | 8/2009 |

* cited by examiner

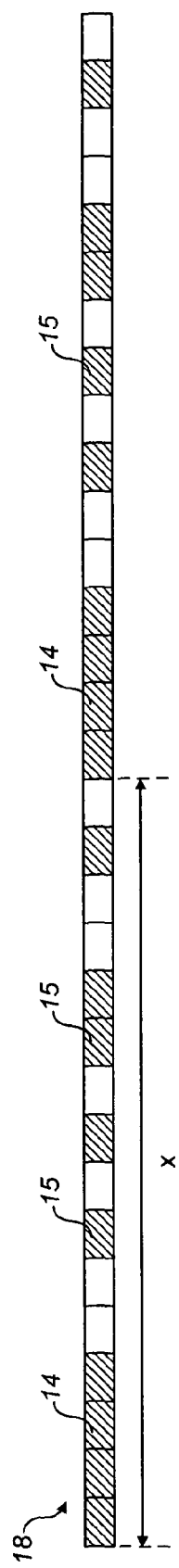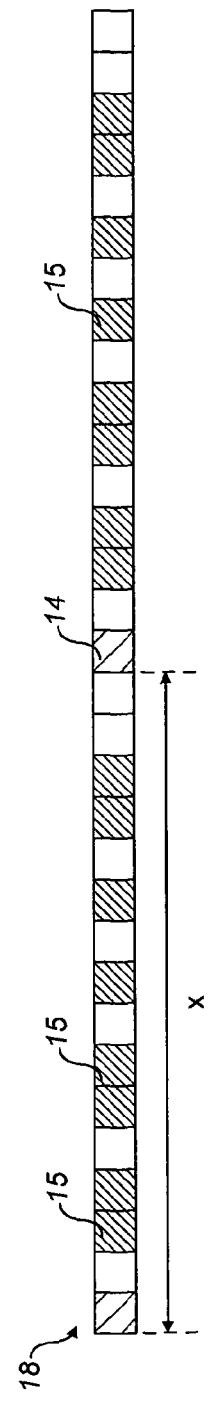

SECURITY SUBSTRATES FOR SECURITY DOCUMENTS

CROSS-REFERENCE TO RELATED APPLICATIONS

This application is the United States National Phase of PCT Patent Application No. GB2011/000218 filed 16 Feb. 2011, which claims priority to Great Britain Application No. 1003824.8 filed 8 Mar. 2010, which are incorporated herein by reference.

BACKGROUND OF THE INVENTION

The invention relates to improvements insecurity substrates for security documents.

Documents of value and means of identification, such as banknotes, passports, identification cards, certificates and the like, are vulnerable to copying or counterfeiting. The increasing availability of colour photocopiers, electronic scanning and other imaging systems, and the improving technical quality of colour photocopiers, has led to an increase in the counterfeiting of such documentation. There is, therefore, a need to continually improve the security features of such documentation to add additional security features or to enhance the perceptions and resistance of simulation to existing features.

Security features generally fall in two categories, overt and covert. Overt security features are ideally easily recognisable to the person in the street without the need for an additional device, whilst being difficult to counterfeit or simulate. Covert security features are generally not made public and are preferably only detectable with the aid of special devices, such as automatic cash and note handling machines. Modern banknotes contain a range of these features, with an even higher-level security feature reserved exclusively for the issuing authority.

Machine readable security features can be located in one or more regions of the banknote, either in the substrate, in the printing or as an applied feature. Some examples of such features include holograms, security threads, magnetic inks, fluorescent pigments, phosphorescent materials, thermochromic features and conductive metallic features.

Unfortunately, to overcome these security features, some counterfeiters have started to produce so-called composite banknotes. In such composite banknotes, part of a genuine banknote is cut out and replaced by a paper strip or the like enabling the cut out part to be used to produce a further, counterfeit banknote or bill. As cash deposit machines will return banknotes that cannot be validated, counterfeiters can use trial and error to determine the locations of machine readable features on notes.

A split note is a type of composite counterfeit note that involves splitting a note down the plane of the paper and creating a new note which comprises the front of the genuine note joined to the back of a counterfeit note. The presence of the half of the genuine note allows these notes to be accepted by a cash deposit machine which validates only one side of the note.

It is therefore an object of the present invention to provide a security substrate for security documents having a machine readable security feature which will overcome this problem.

According to the invention there is provided a security substrate having at least two sets of regions having a machine detectable characteristic, in which only a first set of regions is applied to a first surface of the substrate, wherein the at least two sets of regions together form a machine readable code.

A preferred embodiment of the present invention will now be described in detail, by way of example only, with reference to the accompanying drawings, in which:

FIGS. 7 and 8 illustrate alternative configurations of code.

The security substrates of the present invention have a wide variety of applications, particularly as security documents such as banknotes, passports, bonds, certificates, vouchers or other documents of value.

Figure 1:
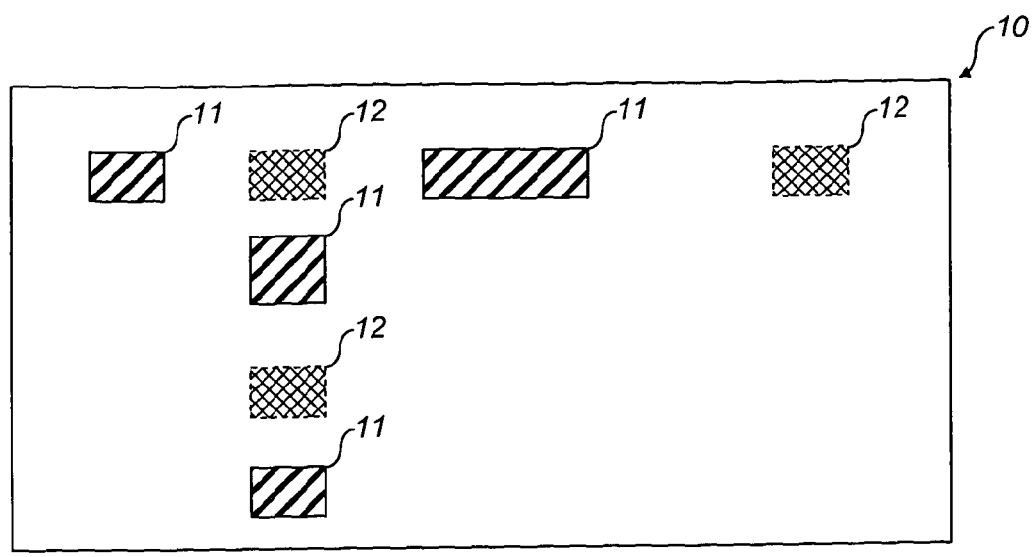
FIG. 1 is a plan view of a banknote made from the substrate of the present invention.

FIG. 1 illustrates a banknote made from the security substrate 10 of the present invention. The substrate selected will be dictated by the end application. In many cases the substrate will be formed of paper (cellulose), polymer or a composite of the two. Examples of typical composite substrates are described in EP-A-1599346 and EP-A-1545902. A suitable polymer substrate for banknotes is Guardian™ supplied by Securency Pty Ltd. In this example the substrate 10 is preferably a fibrous substrate, such as paper. The substrate 10 comprises two sets 11,12 of machine readable regions which, together, form a machine readable code. The sets 11, 12 of machine readable regions may be applied so that the first set of machine readable regions 11 are on one surface of the substrate 10 and the second set 12 of machine readable regions are on the opposing surface. Alternatively one set 11 of machine readable regions may be applied to one surface of the substrate 10 and the other set 12 of machine readable regions are carried on a security element at least partially embedded in the substrate 10. However it is important that the relationship between the two elements of the code cannot be detected visually when viewed from either side of the substrate 10 and are seemingly unrelated, i.e. the coded pattern cannot be determined with the naked eye from either side of the substrate.

The machine readable characteristic may be conductivity, fluorescence, luminescence, magnetic or another characteristic and the sets 11, 12 of machine readable regions may be visible (overt) or invisible (covert) to the naked eye. In one aspect of the invention the machine readable characteristic is the same for the two sets of machine readable regions, for example both would have magnetic characteristics. Alternatively the sets 11 and 12 could have different machine readable characteristics. For example set 11 could be magnetic and set 12 could be fluorescence. Ideally the machine readable characteristics for the sets 11, 12 of machine readable regions are selected such that they are preferably readable by a suitable detector from either side of the substrate 10. For example the use of magnetic material for the two sets 11,12 would mean the coded pattern could be read from either side of the substrate. This minimises the need to modify existing cash handling machines.

If the sets 11, 12 of machine readable regions are visible they are selected to appear seemingly unrelated when the substrate 10 is examined visually. However when read by a detector the sets 11, 12 of machine readable regions together form a machine readable code. Thus if the substrate 10 is split in the plane of the substrate 10, none of the split sections would have both sets 11,12. Thus if one part were used to create a composite counterfeit, the code would not be complete and the counterfeit document would be rejected as invalid.

In general terms a code is a system for communication of hidden information, in particular secret information, in which the meaning of said information is conveyed using elements (in this case machine readable elements), said configuration of elements being chosen so as to render the information unintelligible to casual interrogation. The code provided by the machine readable elements of the present invention is preferably a spatial code, i.e. it is the relative position of the individual elements that provides the information rather than the appearance of the elements.

Figure 2:
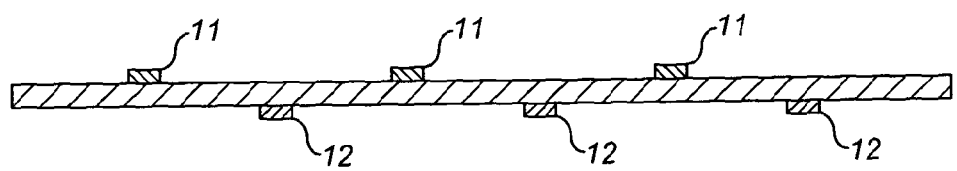
FIG. 2 is a cross sectional side elevation of a substrate of the present invention.
Figure 3:
FIG. 3 shows the magnetic signal detected by a detector from the substrate of FIG. 2.

To form the machine readable code there must be at least three machine readable regions of which at least one must be in each of the first and second sets 11,12. FIG. 2 illustrates first and second sets 11,12 of machine readable regions on opposing surfaces. The machine readable regions of the first and second sets 11,12 are positioned in a predetermined relationship relative to each other, for example with specific distances between each region. In this particular example the machine readable regions are formed from a magnetic material, for example iron oxide. When the substrate 10 passes through the magnetic detector at a particular speed, the timing between the peaks recorded on an oscilloscope measuring the magnetic signal will indicate the distance between the regions. The substrate 10 of the present invention will therefore produce a predetermined pattern of peaks on an oscilloscope trace as shown in FIG. 3, whereas a composite counterfeit formed by cutting or dividing the substrate 10 into one or more sections and reassembling parts of it will not produce the correct pattern. The code is also preferably multidirectional, such that it can be read by machines that use either long or short edge feeding. In practice the detector will not have an oscilloscope, and a soft algorithm is used to convert the magnetic signal into a code.

The code may be such that the denomination of a banknote may be determined from the code.

Where the regions are printed, the printing ink may be applied by any of the known printing techniques such as screen, flexography, lithography, intaglio, gravure, dye diffusion, laser, ink jet, letterpress and toner transfer. The method used to print can affect the signal obtained from the code. For example intaglio printing lays down more ink than other printing methods so the signal would be stronger. Litho printing would result in a more diffuse signal.

In one embodiment of the invention, the first and second sets 11,12 of machine readable regions are formed from a magnetic ink, such as iron oxide, or another iron, nickel or cobalt based material. Ferrites, such as barium ferrite, and alloys, such as AlNiCo or NdFeCo, would also be suitable. Hard or soft magnetic materials may also be used, or materials with high or low coercivity. Transparent magnetic inks such as those described in GB-A-2387812 and GB-A-2387813 are also suitable.

The code may be a block magnetic code. Block magnetic coding describes the arrangement of regions containing magnetic material separated by blank spaces. More advanced magnetic codes digitise the code. IMT is an example of spacial coding, and is described in EP-A-407550 and another type of coding is intensity coding.

Magnetic materials with a low coercivity can be used to form the code. The magnetic signal detected from a low coercivity material can differ in polarity from an iron oxide type material depending on the geometry of the detector. Such low coercivity materials have a lower coercivity than conventional iron oxide materials which means that they can be reversed in polarity by weaker bias magnetic fields, whilst they are still magnetically hard so that they retain the induced magnetism which can then be detected when the article is in a region no longer affected by the bias magnetic field. This is known as a reversed edge magnetic signature. Suitable low coercivity magnetic materials preferably have a coercivity in the range 50-150 Oe, most preferably 70-100 Oe. The upper limit of 150 Oe could increase with higher biasing fields. A number of examples of suitable materials include iron, nickel, cobalt and alloys of these. In this context, the term "alloy" includes materials such as Nickel:Cobalt, Aluminium:Nickel:Cobalt and the like. Flake nickel materials can be used. In addition, iron flakes are also suitable. Typical iron flakes have lateral dimensions in the range 10-30 μm and a thickness less than 2 μm. The preferred materials include metallic iron, nickel and cobalt based materials (and alloys thereof) which have the highest inherent magnetisations and so benefit from the requirement for least material in a product to ensure detectability. Iron is the best of the three with the highest magnetisation, but nickel has been shown to work well from other considerations EP1770657A2 discloses a method of detecting such low coercivity materials. If both nickel based and iron based magnetic inks are used at set positions, then a more complex code can be achieved.

It is important that the code is detected and related to the physical dimension of the document made from the security substrate of the present invention. One method for achieving this is to have a binary code with a recognisable start and end bit 14 to a detection trace. The presence of start and end bits 14 enables the detector to "clock" or recognise the detection trace independent of the note speed in the detector and so enable a measurement of the complete length of the document 13 and thus determine where the other code elements should be. Suggestions to enable a self-clocking code would be a known length of start magnetic block (as described in EP-A-407550), a reversed edge magnetic signature (as described in EP-A-1770657), or the presence of materials with different magnetic properties for example the material used for the start bit would have a higher magnetic remanence then the rest of the bits. FIG. 7 illustrates an example of a self-clocking code. In this case the code length x is 16 bits with the start of the code being identified by the presence of a start block 14 formed from a sequence of four magnetic bits 15. FIG. 8 illustrates an example where the start block 14 comprises a material of lower coercivity to the other blocks 15 in the code and therefore its presence can be detected by the presence of a reversed edge magnetic signature as described in EP-A-1770657.

It is preferable that the code 18 is read by measuring relative distances between the elements in sets 11, 12 to remove the effect of registration tolerances between the two methods used to apply the code to the different surfaces or the methods used to apply the code 18 to one surface and the method used to embed it in the document. For example if sets 11,12 of machine readable regions were applied by intaglio printing on opposite sides of the substrate the registration tolerance could be as high as 3 mm.

The magnetic material is typically detected by a magnetic detector but it also possible to detect the presence of a magnetic material using an x-ray detector as a magnetic material typically appears as a dark region in an x-ray image when present on a paper or polymer substrate.

Conductive polymer inks are available, such as PEDOT: PSS (Poly(3,4-ethylenedioxythiophene) poly(styrenesulfonate), which can be applied by a printing process, to provide a conductive feature.

Machine readable luminescent materials which could be used to form a code are well known in the prior art, but examples particularly suitable for machine readable codes are provided in WO-A-9739428

One of the sets 11,12 of machine readable regions may be applied to a security device, such as an elongate thread. The security device may be either wholly embedded within the substrate 10, or partially embedded in the substrate 10 so that it is revealed at intervals in windows. EP-A-1567714 provides one method of controlling the insertion of a thread into a paper substrate. This would allow the position of the coded elements on the thread to be controlled in relation to the dimension of the paper security document thus ensuring that they are the same for each document. Alternatively one or both of the sets 11,12 of the machine readable regions may be applied to one or more discrete security patches applied to either side of the substrate. The code may be formed by partly metallising/demetallising a carrier substrate such as PET to form the security device.

Figure 4A:
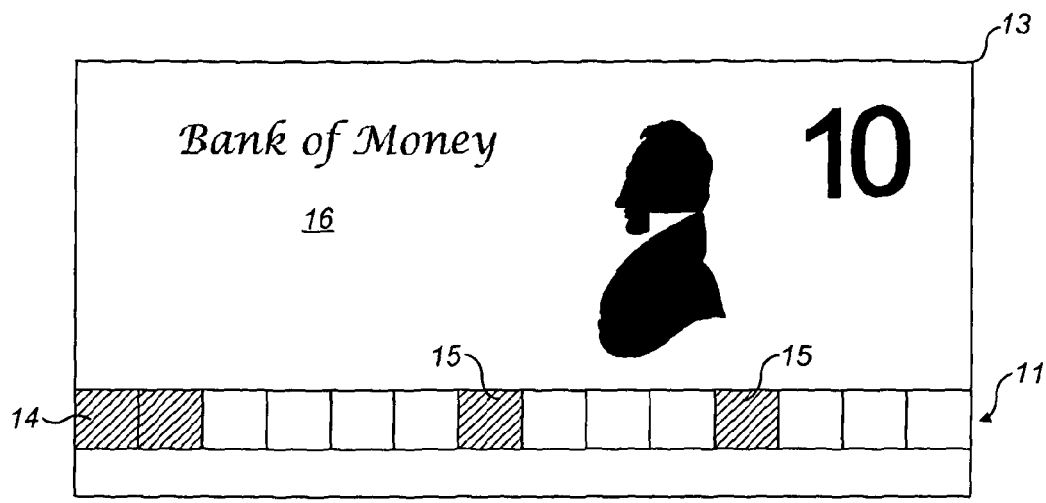
FIGS. 4a and 4b are plan views of the front and back of a banknote made from the substrate of the present invention.
Figure 4B:
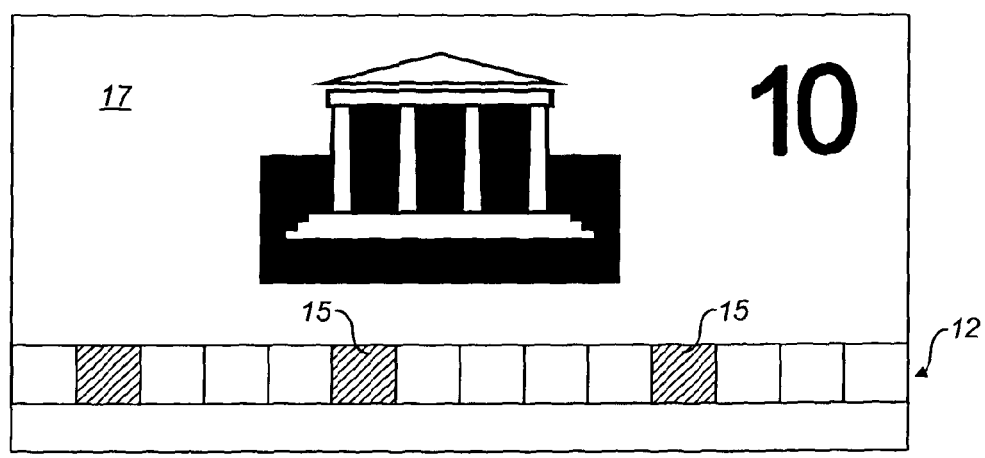
Figure 4C:
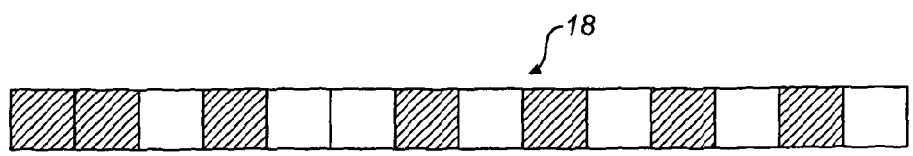
FIG. 4c shows the complete code used on the banknote of FIGS. 4a and 4b.

FIGS. 4a to 4c show by example the presence of a self-clocking magnetic code on a security document 13 such as a banknote. The start block 14, formed from two magnetic bits 15, and two further bits 15, together forming the first set 11 of machine readable regions, are printed on the front 16 of the document 13 (FIG. 4a. The remaining three magnetic bits 15, which form the second set 12 of machine readable regions, are printed, in register with the regions of the first set 11, on the back 17 of the document 13. The completed code 18 as read by the detector is shown in FIG. 4c. In this example, only one repeat of the code 18 is included on the document 13, however any number of repeats may be included. Multiple repeats of the code 18 provides the system with multi-redundancy such that even if the document is damaged due to crumpling not all of the repeats will be lost, thus still enabling detection of the security code. The magnetic code elements 15 illustrated in FIG. 4 may be visible to the naked eye or they may be substantially invisible, for example if they are printed with transparent magnetic inks such as those described in GB-A-2387812 and GB-A-2387813.

Figure 5A:
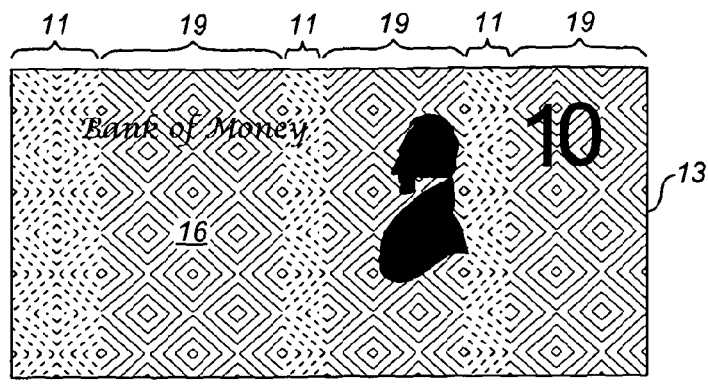
FIGS. 5a to 5d are plan views of the fronts of a banknote having different codings to that illustrated in FIG. 4.

The design of a security document 13 made from the security substrate 10 of the present invention is preferably selected to camouflage the presence of the machine readable coding. FIG. 5a shows multiple strips of the same magnetic code elements forming the first set 11 of machine readable regions running vertically across a document 13 such as a banknote. This is shown by the pattern elements in dotted lines. For simplicity the Figure only shows the front 16 of the document 13 and therefore there will be a second set of code elements forming the second set of machine readable regions 12 printed on the back 17 of the document 13, which are not shown. The magnetic material is applied in the same pattern as that for the non-magnetic regions 19 and therefore the presence of the coded regions is not readily apparent to a member of the public.

Figure 5B:
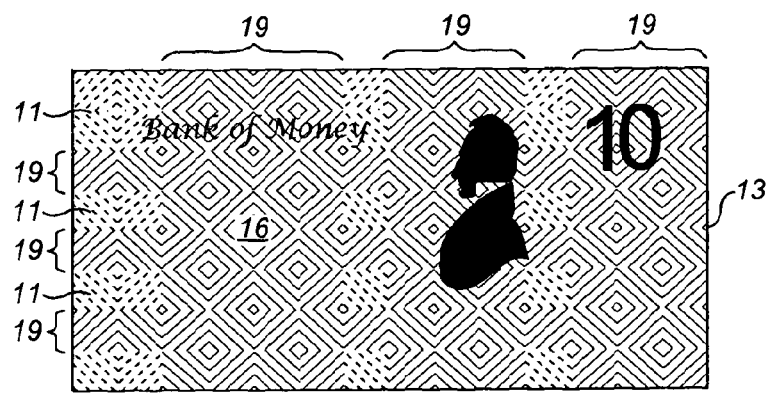
Figure 5C:
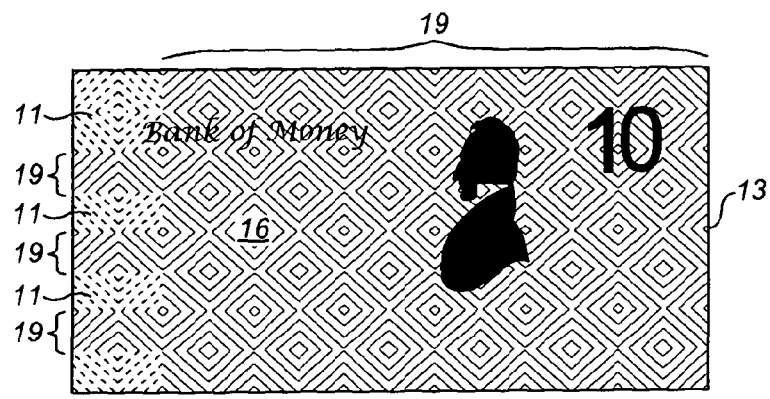
Figure 5D:
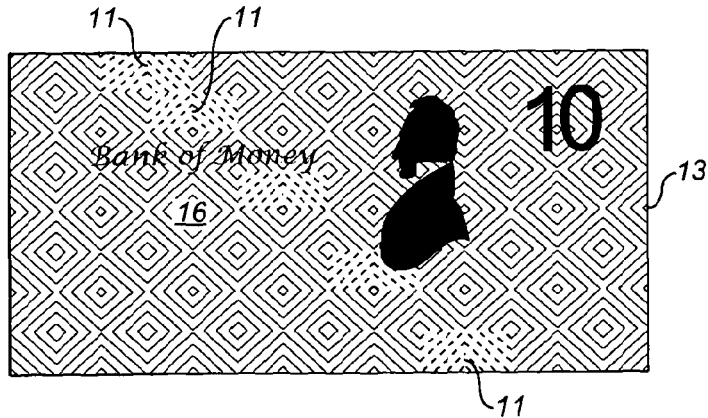

Preferably the code 18 extends over substantially the full length and/or width of the document 13. For example FIG. 5b illustrates multiple strips of code forming the first set 11 of machine readable regions running in both the horizontal and vertical directions such that it can be read by machines that use either long or short edge feeding. FIG. 5c illustrates an example of where the document 13 comprises two vertical strips of coding forming the first set 11 of machine readable regions. FIG. 5d illustrates a further possibility where the strips of coding forming the first set 11 of machine readable regions is positioned diagonally across the secure document 13.

Figure 6:
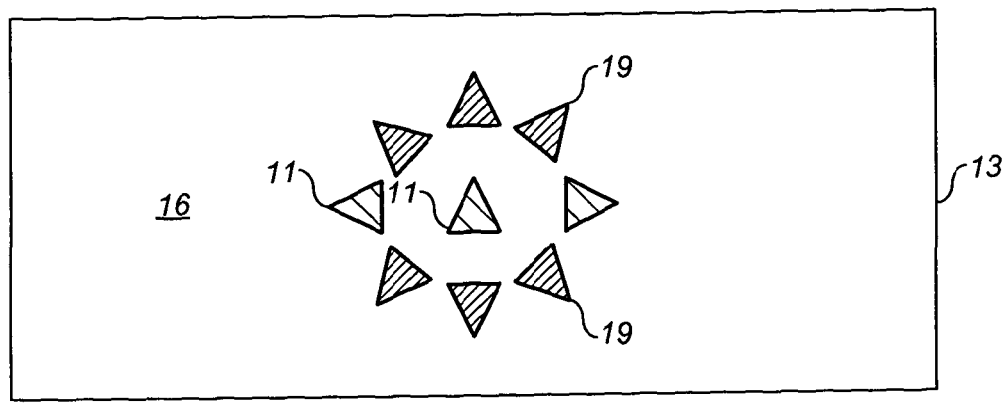
FIG. 6 is a plan view of the front of a banknote having different coding to that illustrated in FIGS. 4 and 5.

Preferably the areas of coding are fully integrated into the design of the security document and do not interrupt the layout of the document. It is possible to have a design where only certain areas are formed from the coding material; and the code elements could have the same colour and/or shape of the non-coded elements. In a further example code elements within one or both sets can be different colours. FIG. 6 shows magnetic code elements forming the first set 11 of machine readable regions integrated into a design on the front 16 of a secure document 13. The design comprises a decorative pattern of triangular symbols where only the symbols defining a central line through the pattern are the magnetic code elements. The magnetic symbols are may be of different colours in the but preferably they would be the same colour as the non-magnetic triangular symbols 19, enabling the presence of the coded elements to be disguised.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A banknote printed with a design, said design having at least two sets of coded regions printed with a machine detectable ink, in which only a first set of regions is located on a first surface of the banknote, and the at least two sets of regions together provide a complete machine readable spatial code, and the at least two sets of regions are integrated into the printed design and wherein only certain areas of the design are formed from the at least two sets of coded regions such that the coded regions are not readily apparent and the machine readable code is detectable from either side of the banknote.

2. A banknote as claimed in claim 1 in which the first and/or second set of regions is applied to a security device applied to the surface(s) of the banknote.

3. A banknote as claimed in claim 1 in which the machine detectable ink has a machine detectable characteristic which is the same for the regions in each set.

4. A banknote as claimed in claim 3 in which the machine detectable characteristic is selected from the group consisting of: magnetism, fluorescence, luminescence or conductivity.

5. A banknote as claimed in claim 3 in which the machine detectable characteristic of each set of regions is detectable from either side of the substrate.

6. A banknote as claimed in claim 1 in which the machine detectable ink has a machine detectable characteristic which is different to the machine detectable characteristic of the machine detectable ink of the other set.

7. The banknote as claimed in claim 6 in which the machine detectable characteristic is selected from the group consisting of: magnetism, fluorescence, luminescence or conductivity.

8. The banknote as claimed in claim 6 in which the machine detectable characteristic of each set of regions is detectable from either side of the substrate.

9. A banknote as claimed in claim 1 in which the regions are visible to the naked eye.

10. A banknote as claimed in claim 9 in which only one set of regions is visible when one side of the banknote is viewed.

11. A banknote as claimed in claim 1 in which the regions cannot be detected visually.

12. A banknote as claimed in claim 1 in which a relationship between the sets of regions forming the code cannot be detected visually.

13. A banknote as claimed in claim 1 in which the code is a covert code.

14. A banknote as claimed in claim 1 in which the code is a binary code incorporating start and end bits.

15. A banknote as claimed in claim 1 in which the code is spatially related to a physical dimension of the document.

16. The banknote as claimed in claim 15 in which the code is a covert code.

17. A banknote as claimed in claim 1 in which a second set of regions is applied to a security device at least partially embedded in the substrate.

18. The banknote as claimed in claim 17 in which the first set of regions is applied to a security device applied to the surface of the substrate.

19. A banknote as claimed in claim 1 in which a second set of regions is applied to a second opposing surface of the banknote.

\* \* \* \* \*